(12) United States Patent
Champion et al.

(10) Patent No.: US 11,905,198 B2
(45) Date of Patent: Feb. 20, 2024

(54) PRODUCT CONTAINING CHROMIUM 3 OXIDE FOR GLASS FURNACE

(71) Applicant: SAINT-GOBAIN CENTRE DE RECHERCHES ET D'ETUDES EUROPEEN, Courbevoie (FR)

(72) Inventors: Thibault Champion, Villelaure (FR); Pierrick Vespa, Aix-en-Provence (FR); Lionel Moitrier, Mallemort (FR); Olivier Citti, Cavaillon (FR); Julien Pierre César Fourcade, Shrewsbury, MA (US); Nabil Nahas, Cavaillon (FR)

(73) Assignee: SAINT-GOBAIN CENTRE DE RECHERCHES ET D'ETUDES EUROPEEN, Courbevoie (FR)

(*) Notice: Subject to any disclaimer, the term of this patent is extended or adjusted under 35 U.S.C. 154(b) by 534 days.

(21) Appl. No.: 16/954,014

(22) PCT Filed: Dec. 20, 2018

(86) PCT No.: PCT/EP2018/086310
§ 371 (c)(1),
(2) Date: Jun. 15, 2020

(87) PCT Pub. No.: WO2019/122196
PCT Pub. Date: Jun. 27, 2019

(65) Prior Publication Data
US 2021/0078893 A1 Mar. 18, 2021

(30) Foreign Application Priority Data

Dec. 22, 2017 (FR) .................................... 1762941
Jul. 30, 2018 (FR) .................................... 1857097

(51) Int. Cl.
| | |
|---|---|
| *C03B 5/43* | (2006.01) |
| *C04B 35/12* | (2006.01) |
| *C04B 35/047* | (2006.01) |
| *C04B 41/50* | (2006.01) |
| *C03B 5/237* | (2006.01) |
| *C03B 5/26* | (2006.01) |

(52) U.S. Cl.
CPC .............. *C03B 5/43* (2013.01); *C03B 5/2375* (2013.01); *C03B 5/26* (2013.01); *C04B 35/12* (2013.01); *C04B 2235/3206* (2013.01); *C04B 2235/3208* (2013.01); *C04B 2235/3244* (2013.01); *C04B 2235/3272* (2013.01); *C04B 2235/3418* (2013.01)

(58) Field of Classification Search
CPC ....... C03B 5/43; C03B 5/2375; C03B 5/1672; C03B 5/425; C03B 5/26; C04B 35/12; C04B 35/66; C04B 35/047; C04B 35/105; C04B 2235/3206; C04B 2235/3244; C04B 2235/3208; C04B 2235/3272; C04B 2235/3418; C04B 2235/3217; C04B 7/02; C04B 7/32; C04B 2111/00215; C04B 2111/28; C04B 41/5022; C04B 28/06; F27D 1/0006; Y02P 40/50

See application file for complete search history.

(56) References Cited

U.S. PATENT DOCUMENTS

| | | | |
|---|---|---|---|
| 5,219,807 A | 6/1993 | Pavlica et al. | |
| 6,447,596 B1 | 9/2002 | Tremblay et al. | |
| 6,815,386 B1* | 11/2004 | Kwong | ............... C04B 35/6306 501/126 |
| 2008/0274870 A1 | 11/2008 | Treimer | |
| 2011/0152059 A1 | 6/2011 | Prior et al. | |
| 2018/0237344 A1* | 8/2018 | Cabodi | ................. C04B 35/634 |

FOREIGN PATENT DOCUMENTS

| | | |
|---|---|---|
| CN | 1200309 A | 12/1998 |
| CN | 1690016 A | 11/2005 |
| CN | 103979992 A | 8/2014 |
| CN | 107235722 A | 10/2017 |
| EP | 0733604 A1 | 9/1996 |
| FR | 2918659 A1 | 1/2009 |
| GB | 1533890 A | 11/1978 |
| JP | H08245261 A | 9/1996 |
| JP | 2002192125 A | 7/2002 |
| KR | 20100111055 A | 10/2010 |
| WO | 2010019323 A2 | 2/2010 |
| WO | 2012020344 A1 | 2/2012 |

OTHER PUBLICATIONS

International Search Report corresponding International application PCT/EP2018/086310 dated Mar. 19, 2019, 9 pages.
Chinese Office Action, from Corresponding Chinese Application No. 201880083312.X, dated May 25, 2023.
Chinese Office Action, from Corresponding Chinese Application No. 201880083312.X, dated Jan. 3, 2022.

* cited by examiner

*Primary Examiner* — Matthew E. Hoban
*Assistant Examiner* — Lynne Edmondson
(74) *Attorney, Agent, or Firm* — Ronald M. Kachmarik; Cooper Legal Group LLC

(57) ABSTRACT

A glass furnace including an additive-containing product including an additive selected from: phosphorus compounds other than glasses and vitroceramics, tungsten compounds other than glasses and vitroceramics, molybdenum compounds other than glasses and vitroceramics, iron in the form of metal, aluminum in the form of metal, silicon in the form of metal, and their mixtures, silicon carbide, boron carbide, silicon nitride, boron nitride, glasses including elemental phosphorus and/or iron and/or tungsten and/or molybdenum, vitroceramics including elemental phosphorus and/or iron and/or tungsten and/or molybdenum, and their mixtures, and having the following chemical analysis, exclusively of the additive, as a percentage by weight on the basis of the oxides: $Cr_2O_3 \geq 2\%$, and $Cr_2O_3+Al_2O_3+CaO+ZrO_2+MgO+Fe_2O_3+SiO_2+TiO_2 \geq 90\%$, and $Cr_2O_3+Al_2O_3+MgO \geq 60\%$, the content by weight of additive being in the range 0.01% to 6%.

26 Claims, No Drawings

PRODUCT CONTAINING CHROMIUM 3 OXIDE FOR GLASS FURNACE

FIELD OF THE INVENTION

The invention relates to a method for the manufacture of a product comprising chromium 3 oxide, as well as to a product of this type. The invention also relates to a glass furnace comprising a product of this type, as well as to a method for the manufacture of a furnace of this type.

PRIOR ART

Chromium is an element that exists in several oxidation states: 0, +2, +3, +4, +6.

The +3 is the most common form, such as chromium 3 oxide (or chromium III oxide), or $Cr_2O_3$.

Products comprising chromium 3 oxide are conventionally obtained by mixing raw materials and shaping in order to obtain a preform, the mixture of raw materials comprising a cement when the preform is a hardened concrete. Depending on the intended use, the preform may be fired at a temperature and for a period of time which are sufficient to obtain sintering. Sintering may also be carried out in situ, when high temperatures are used for the preform.

Products comprising chromium 3 oxide are conventionally used in applications where they are subjected to extreme chemical attack, and in particular in glass furnaces, in particular as furnace vessel blocks FR 2 918 659 in particular describes a sintered product based on alumina and chromium oxide intended for use as an electrode bushing block. That product has good corrosion resistance by molten glass and a high electrical resistivity, in particular at temperatures of approximately 1500° C. However, FR 2 918 659 is not concerned with the problem arising from the formation of hexavalent chromium, which is the +6 form of chromium, or "chromium 6", as in $CrO_3$. Chromium 6 is in fact a substance that is known to be carcinogenic, mutagenic and reprotoxic to man. It can result from a transformation of chromium 3 oxide.

U.S. Pat. No. 6,447,596 describes a binder that can be used in a concrete, and mentions an application to a vessel containing molten glass. Large quantities of phosphoric acid, $H_3PO_4$, are thus introduced into the concrete.

Glass furnaces have a specific environment. In particular, in a glass furnace, the blocks are subjected to mechanical and chemical stresses that differ from those encountered in metallurgical furnaces, in which they are in contact with a slag. A priori, therefore, a block for a metallurgical furnace is not suitable for a glass furnace, and vice versa.

Thus, there is a constant need for limiting the formation of chromium 6, both during manufacture and during use of a product, in particular of a concrete containing chromium 3 oxide.

The aim of the present invention is to satisfy that need, at least in part.

SUMMARY OF THE INVENTION

The invention concerns an additive-containing product comprising, in the core and/or at the surface, an additive selected from
- phosphorus compounds other than glasses and vitroceramics,
- tungsten compounds other than glasses and vitroceramics,
- molybdenum compounds other than glasses and vitroceramics,
- iron in the form of the metal, aluminum in the form of the metal, silicon in the form of the metal, and their mixtures, for example FeSi or AlSi,
- silicon carbide,
- boron carbide,
- silicon nitride,
- boron nitride,
- glasses comprising elemental phosphorus and/or iron and/or tungsten and/or molybdenum,
- vitroceramics comprising elemental phosphorus and/or iron and/or tungsten and/or molybdenum,
- and their mixtures, the additive-containing product having the following chemical analysis exclusively of the additive as percentages by weight on the basis of the oxides:
- $Cr_2O_3 \geq 2\%$, preferably $Cr_2O_3 \geq 9\%$ and preferably $Cr_2O_3 < 98\%$,
- preferably, $CaO < 3\%$, and preferably, $CaO > 0.1\%$,
- $Cr_2O_3 + Al_2O_3 + CaO + ZrO_2 + MgO + Fe_2O_3 + SiO_2 + TiO_2 \geq 90\%$, and
- $Cr_2O_3 + Al_2O_3 + MgO \geq 60\%$.

As will be seen in more detail in the remainder of the description, an additive-containing product of this type generates far less chromium 6 than the products which are without the additive. The additive also means that the preform has a sufficient mechanical strength to allow it to be handled when the preform is manufactured from a hardened concrete.

The inventors have also discovered that, in a glass furnace, it is advantageous for the content by weight of additive to be in the range 0.01% to 6%, on the basis of the weight of the additive-containing product. In particular, when the weight content of additive is greater than 6% on the basis of the weight of the additive-containing product, corrosion of the additive-containing product by the molten glass is too great and/or the quantity of flaws generated by said additive-containing product in the molten glass is too high and/or the mechanical properties, particularly thermal properties, of said additive-containing product are too poor to permit use in a glass furnace.

The additive-containing product may also comprise one or more of the following optional characteristics:
- the additive-containing product has a weight of more than 1 kg or is a particulate mixture;
- the additive-containing product is a hardened concrete or a sintered concrete or is a ramming mass;
- the additive is distributed in a substantially homogeneous manner in the core and/or at the surface, preferably in a substantially homogeneous manner in the core and at the surface, preferably over a surface that is not intended to come into contact with molten glass;
- in one embodiment, the additive in the core of the additive-containing product is different from the additive at the surface of said additive-containing product;
- the additive is preferably selected from $FePO_4$, $MgPO_4$, $ZnPO_4$, $CuPO_4$, phosphoric acid, $WO_3$, WC, $MoO_3$, Si, Al, Fe, SiAl, FeSi, SiC, $B_4C$, $Si_3N_4$, a glass comprising iron, and their mixtures;
- preferably, the additive is selected from $FePO_4$, $MgPO_4$, phosphoric acid, $WO_3$, $MoO_3$, SiAl, FeSi, SiC, a glass comprising iron, preferably a glass comprising an iron content, expressed in the form of $Fe_2O_3$, in the range 1% to 15%, preferably in the range 4% to 15%, and their mixtures;
- preferably, the additive is selected from $FePO_4$, $MgPO_4$, $WO_3$, $MoO_3$, SiAl, FeSi, SiC, a glass comprising iron, preferably a glass comprising an iron content, expressed in the form of $Fe_2O_3$, in the range 1% to 15%, preferably in the range 4% to 15%, and their mixtures;

in one embodiment, the additive is selected from $FePO_4$, $MgPO_4$, $CuPO_4$ and their mixtures, preferably from $FePO_4$, $MgPO_4$, and their mixtures;

in one embodiment, the additive does not contain phosphorus, in particular when the additive-containing product to be manufactured does not contain a hydraulic binder, and in particular is not a concrete;

the additive-containing product has, exclusively of the additive, as percentages by weight on the basis of the oxides:

a chromium 6 content of less than 0.1%, preferably less than 0.08%, preferably less than 0.05%, preferably less than 0.03%, as a percentage by weight;

in one embodiment, a content of $Cr_2O_3$ of more than 3%, preferably more than 4%, preferably more than 6%, preferably greater than or equal to 9%, preferably more than 15%, preferably more than 20%, preferably more than 25%, preferably more than 30%, preferably more than 35%; and/or in one embodiment, a content of $Cr_2O_3$ of more than 4%, preferably more than 5% and preferably less than 15%, preferably less than 12%, preferably less than 9%; and/or in one embodiment, a content of $Al_2O_3$ of more than 70%, preferably more than 75%, preferably more than 80%, or even more than 85%, or even more than 90%; and/or in one embodiment, a content of CaO of more than 0.2%, preferably more than 0.3%, preferably more than 0.4% and/or less than 2.5%, preferably less than 2%, preferably less than 1.5%, preferably less than 1%, preferably of less than 0.8%; and/or in one embodiment, a content of CaO of less than 0.5%, preferably less than 0.3%; and/or a content of $Cr_2O_3+Al_2O_3$ of more than 55%, preferably more than 60%, preferably more than 65%, preferably more than 70%, preferably more than 80%, or even of more than 90%, or even of more than 92%, or even of more than 94%, as a percentage by weight; and/or a content of $SiO_2$ of more than 0.5%, preferably more than 1%, and less than 12%, preferably less than 8%, as a percentage by weight; and/or a content of $ZrO_2$ of more than 1%, preferably more than 3%, preferably more than 4% and less than 19%, preferably less than 15%, as a percentage by weight; and/or in one embodiment, a total content of $Cr_2O_3+Al_2O_3+MgO$ of more than 80%, preferably more than 85%, preferably more than 90%, preferably more than 95%; and/or a total content of the complement to $Cr_2O_3$, $Al_2O_3$, CaO, $ZrO_2$, MgO, $Fe_2O_3$, $SiO_2$ and $TiO_2$ that is preferably less than 8%, preferably less than 6%, preferably less than 5%, preferably less than 4%, preferably less than 3% of the weight of the additive-containing product, exclusively of the additive; and/or in one embodiment, a content of MgO of less than 20%, preferably less than 15%, preferably less than 10%, preferably less than 5%, preferably less than 4%, preferably less than 3%, preferably less than 2%, preferably less than 1%, preferably less than 0.5%, or even less than 0.1%; and/or in one embodiment, a content of MgO of more than 5%, preferably more than 7%, preferably more than 10% and less than 15%; and/or in one embodiment, a content of $Fe_2O_3$ of less than 5%, preferably less than 3%, preferably less than 1%, preferably less than 0.5%; and/or in one embodiment, a content of $Fe_2O_3$ of less than 30% and more than 1%, preferably more than 3%; and/or a content of $TiO_2$ of more than 0.3%, preferably more than 0.5%, preferably more than 0.7%, preferably more than 1% and less than 5%, preferably less than 4.5%, preferably less than 4%, preferably less than 3.5%, preferably less than 3%;

in a preferred embodiment, the additive-containing product has, exclusively of the additive, as percentages by weight on the basis of the oxides:

a content of MgO of less than 20%, preferably less than 15%, preferably less than 10%, preferably less than 5%, preferably less than 4%, preferably less than 3%, preferably less than 2%, preferably less than 1%, preferably less than 0.5%, or even less than 0.1%; and a content of $Fe_2O_3$ of less than 5%, preferably less than 3%, preferably less than 1%, preferably less than 0.5%;

the content by weight of additive is preferably more than 0.015%, preferably more than 0.02%, or even, in particular when the additive is in the core of the additive-containing product, more than 0.1%, preferably more than 0.2%, preferably more than 0.3%, preferably more than 0.4%, preferably more than 0.5%;

the content by weight of additive is preferably less than 5%, preferably less than 4%, preferably less than 3%, on the basis of the additive-containing product;

the content of the additive, on the basis of the weight of the additive-containing product, preferably at least in the core of the product, is preferably more than 0.1%, preferably more than 0.2%, preferably more than 0.3%, preferably more than 0.4%, preferably more than 0.5%, and less than 6%, preferably less than 5%, preferably less than 4%, preferably less than 3%; in particular in this embodiment, the additive is preferably selected from phosphorus compounds other than glasses and vitroceramics, tungsten compounds other than glasses and vitroceramics, molybdenum compounds other than glasses and vitroceramics, glasses comprising elemental iron, boron nitride and their mixtures; preferably, an additive-containing product of this type is intended for use at a temperature in the range 100° C. to 400° C.; preferably, in this embodiment, the additive is selected from phosphorus compounds other than glasses and vitroceramics, tungsten oxides, molybdenum oxides, boron nitride and their mixtures, preferably from $FePO_4$, $MgPO_4$, $ZnPO_4$, $CuPO_4$, phosphoric acid, tungsten oxides, molybdenum oxides, and their mixtures. Preferably, the additive is selected from $FePO_4$, $MgPO_4$, phosphoric acid and their mixtures, preferably from $FePO_4$, $MgPO_4$ and their mixtures;

the content of the additive, on the basis of the weight of the additive-containing product, preferably at least in the core of the product, is more than 0.1%, preferably more than 0.2%, preferably more than 0.3%, preferably more than 0.4%, preferably more than 0.5%, and less than 6%, preferably less than 5%, preferably less than 4%, preferably less than 3%; in particular in this embodiment, the additive is preferably selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures; preferably, an additive-containing product of this type is intended for use at a temperature in the range 500° C. to 1200° C.; preferably in this embodiment, the additive is selected from phosphorus compounds other than glasses and vitroceramics, tungsten oxides, molybdenum oxides, and their mixtures, preferably from $FePO_4$, $MgPO_4$, $ZnPO_4$, $CuPO_4$, phosphoric acid, tungsten oxides, molybdenum oxides, and their mixtures. Preferably, the additive is selected from $FePO_4$, $MgPO_4$, phosphoric acid and their mixtures, preferably from $FePO_4$, $MgPO_4$ and their mixtures;

the content of the additive, on the basis of the weight of the additive-containing product, preferably at least at the surface of the product or exclusively at the surface of the product, is more than 0.01%, preferably more than 0.015%, preferably more than 0.02%, and less than 5%, preferably less than 4%, preferably less than 3%, preferably less than 2%, preferably less than 1.5%, preferably less than 1%; in particular in this embodiment, the additive is preferably selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures; preferably, an additive-containing product of this type is intended for use at a temperature in the range 100° C. to 1000° C., or even at a temperature in the range 100° C. to 850° C.; preferably, the additive is selected from phosphorus compounds other than glasses and vitroceramics, tungsten oxides, molybdenum oxides, a glass comprising elemental iron and their mixtures; preferably, the additive is selected from $FePO_4$, $MgPO_4$, $ZnPO_4$, $CuPO_4$, phosphoric acid, tungsten oxides, molybdenum oxides, boron nitride, a glass comprising elemental iron and their mixtures. Preferably, the additive is selected from $FePO_4$, $MgPO_4$, phosphoric acid, tungsten oxides, molybdenum oxides, a glass comprising elemental iron, preferably a glass comprising an iron content, expressed in the form of $Fe_2O_3$, in the range 1% to 15%, preferably in the range 4% to 15%, and their mixtures, preferably from $FePO_4$, $MgPO_4$, tungsten oxides, molybdenum oxides, a glass comprising elemental iron, preferably a glass comprising an iron content, expressed in the form of $Fe_2O_3$, in the range 1% to 15%, preferably in the range 4% to 15%, and their mixtures;

more than 90%, preferably more than 95%, preferably more than 99%, preferably substantially 100% of the additive-containing product, exclusively of the additive, is constituted by oxides.

In one embodiment, the additive-containing product is a ramming mass and has:

exclusively of the additive, as percentages by weight on the basis of the oxides:

a content of $Cr_2O_3$ of more than 2%, preferably more than 3%, preferably more than 4% and preferably less than 25%, preferably less than 20%, preferably less than 15%, preferably less than 12%, preferably less than 9%, and a content of CaO of less than 2%, preferably less than 1%, preferably less than 0.7%, preferably less than 0.5%, preferably less than 0.3%, and a content of $Al_2O_3$ of more than 60%, preferably more than 65%, preferably more than 70%, preferably more than 75%, preferably more than 80%, or even more than 85%, or even more than 90%, and a total content of $Cr_2O_3+Al_2O_3+MgO$ of more than 80%, preferably more than 85%, preferably more than 90%, preferably more than 95%, and a content of MgO of more than 4%, preferably more than 6% and less than 18%, preferably less than 15%, and a content by weight of additive, on the basis of the weight of the ramming mass, of more than 0.1%, preferably more than 0.2%, preferably more than 0.3%, preferably more than 0.4% and less than 6%, preferably less than 5%, preferably less than 4%, preferably less than 3%, the additive preferably being selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, glasses comprising elemental phosphorus and/or iron and/or tungsten and/or molybdenum, vitroceramics comprising elemental phosphorus and/or iron and/or tungsten and/or molybdenum, and their mixtures; preferably from phosphorus compounds other than glasses and vitroceramics, tungsten oxides, molybdenum oxides, and their mixtures, preferably from $FePO_4$, $MgPO_4$, $ZnPO_4$, $CuPO_4$, phosphoric acid, tungsten oxides, molybdenum oxides, and their mixtures, the additive preferably being selected from $FePO_4$, $MgPO_4$ and their mixtures, and a granulate preferably comprising particles comprising $Al_2O_3$ and/or particles comprising $Cr_2O_3$ and/or particles comprising MgO and/or particles comprising a mixture of at least two oxides selected from $Al_2O_3$, $Cr_2O_3$ and MgO and/or particles of additive, the granulate preferably being constituted by particles comprising $Al_2O_3$ and $Cr_2O_3$ on the one hand, and by particles comprising $Al_2O_3$ and/or by particles comprising MgO on the other hand, the quantity of said granulate, as a percentage by weight on the basis of the ramming mass, preferably being less than 90%, preferably less than 85%, and more than 99% by weight of the grains of granulate preferably being less than 20 mm in size, and a matrix fraction preferably comprising particles comprising $Al_2O_3$ and/or particles comprising $Cr_2O_3$ and/or particles comprising MgO and/or particles comprising a mixture of at least two oxides selected from $Al_2O_3$, $Cr_2O_3$ and MgO and/or particles of additive, the quantity of matrix fraction preferably being more than 10%, preferably more than 15% and preferably less than 25%, as a percentage by weight on the basis of the ramming mass.

The invention also concerns a method for the manufacture of an additive-containing product, in particular of a hardened concrete and/or a sintered concrete and/or a ramming mass, said method comprising the following steps in succession:
A) preparing a feedstock;
B) shaping said feedstock in a manner such as to form a preform;
C) optionally, sintering said preform in a manner such as to obtain a sintered product,
a precursor of a said additive being added to the feedstock and/or applied to the surface of the preform and/or applied to the surface of the sintered product,
the feedstock being determined in a manner such that, exclusively of the additive, the preform and the sintered product have the following chemical analysis, as percentages by weight on the basis of the oxides:
$Cr_2O_3 \geq 2\%$, preferably $Cr_2O_3 \geq 9\%$ and preferably $Cr_2O_3 < 98\%$,
preferably, $CaO<3\%$, and preferably, $CaO>0.1\%$,
$Cr_2O_3+Al_2O_3+CaO+ZrO_2+MgO+Fe_2O_3+SiO_2+TiO_2 \geq 90\%$, and
$Cr_2O_3+Al_2O_3+MgO \geq 60\%$.

An additive precursor is a compound that, when carrying out a method, is transformed into an additive in the additive-containing product. Particularly in the absence of step C), an additive precursor added to the feedstock may be found substantially throughout the preform. In certain embodiments, an additive may thus be a particular example of an additive precursor.

When it comprises an additive, a preform and a sintered product manufactured using a method in accordance with the invention are additive-containing products in accordance with the invention. The feedstock may be adjusted so that the additive-containing products have one or more of the optional characteristics relating to an additive-containing product in accordance with the invention.

The method for the manufacture of an additive-containing product in accordance with the invention may also have one or more of the following optional characteristics:
the additive precursor is selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures;
said additive precursor is selected from $FePO_4$, $MgPO_4$, $ZnPO_4$, $CuPO_4$, $H_3PO_4$, $WO_3$, $WC$, $MoO_3$, $Si$, $Al$, $Fe$, $SiAl$, $FeSi$, $SiC$, $B_4C$, $Si_3N_4$, a glass comprising iron, and their mixtures;
said additive precursor is selected from $FePO_4$, $MgPO_4$, $H_3PO_4$, $WO_3$, $MoO_3$, $SiAl$, $FeSi$, $SiC$, a glass comprising iron, preferably a glass comprising an iron content, expressed in the form of $Fe_2O_3$, in the range 1% to 15%, preferably in the range 4% to 15%, and their mixtures;
the content by weight of additive precursor, on the basis of the weight of the particulate mixture of the feedstock, exclusively of the shaping agent, is more than 0.1%, preferably more than 0.2%, preferably more than 0.3%, preferably more than 0.4%, preferably more than 0.5%, and preferably less than 6%, preferably less than 5%, preferably less than 4%, preferably less than 3%;
the additive precursor is deposited onto the surface of the preform or onto the surface of the sintered product, the content by weight of the additive precursor being in the range 0.01% and 5% on the basis of the weight of the preform after depositing the additive precursor or of the sintered product after depositing the additive precursor;
preferably, the additive precursor is deposited onto the surface of the preform or onto the surface of the sintered product, the content by weight of additive precursor being more than 0.01%, preferably more than 0.015%, preferably more than 0.02%, and less than 5%, preferably less than 4%, preferably less than 3%, preferably less than 2%, preferably less than 1.5%, preferably less than 1%, on the basis of the weight of the preform after depositing the additive precursor or of the sintered product after depositing the additive precursor respectively;
the feedstock comprises a granulate having a median circularity of more than 0.87;
the feedstock comprises a matrix fraction constituted by particles having a size of less than or equal to 50 μm which does not contain a hydraulic binder;
the additive precursor is applied to a surface which is not intended to come into contact with molten glass;
the median size of the powdered additive precursor in the feedstock is preferably less than 150 μm, preferably less than 100 μm, preferably less than 80 μm, preferably less than 60 μm, preferably less than 50 μm, preferably less than 40 μm, preferably less than 30 μm, or even less than 20 μm;
the content by weight of additive precursor in the feedstock is adjusted in a manner such that the additive content in the additive-containing product is preferably more than 0.1%, preferably more than 0.2%, preferably more than 0.3%, preferably more than 0.4%, preferably more than 0.5%, and preferably less than 6%, preferably less than 5%, preferably less than 4%, preferably less than 3%, on the basis of the weight of the additive-containing product;
the content by weight of additive precursor is preferably adjusted in a manner such that the additive content in the additive-containing product, on the basis of the additive-containing product, is in the range 0.01% to 6%, and preferably is more than 0.015%, preferably more than 0.02%, or even, in particular when the additive is in the core of the additive-containing product, more than 0.1%, preferably more than 0.2%, preferably more than 0.3%, preferably more than 0.4%, preferably more than 0.5%, and preferably less than 5%, preferably less than 4%, preferably less than 3%, on the basis of the additive-containing product;
the content of the additive, on the basis of the weight of the additive-containing product, preferably at least at the surface of the product or exclusively at the surface of the product, is more than 0.01%, preferably more than 0.015%, preferably more than 0.02%, and less than 5%, preferably less than 4%, preferably less than 3%, preferably less than 2%, preferably less than 1.5%, preferably less than 1%;
the matrix fraction of the feedstock does not comprise a hydraulic binder;
in step B), the median size of the powdered additive precursor applied to the surface of the preform is preferably less than 1 mm, preferably less than 500 µm, preferably less than 400 µm, preferably less than 300 µm, preferably less than 200 µm, preferably less than 100 µm;

the content by weight of additive precursor applied to the surface of the preform or to the surface of the sintered product is adjusted in a manner such that the additive content in the additive-containing product, on the basis of the additive-containing product, is more than 0.01%, preferably more than 0.015%, preferably more than 0.02%, and less than 5%, preferably less than 4%, preferably less than 3%, preferably less than 2%, preferably less than 1.5%, preferably less than 1%, on the basis of the weight of the additive-containing product;

the additive precursor is a said additive; thus, it is present in the additive-containing product in substantially the same quantities.

The invention also concerns a particulate mixture having a composition that is suitable for obtaining an additive-containing product in accordance with the invention by simple activation and/or by simple shaping and/or by simple sintering (i.e. with no additional operations that substantially modify the composition). A particulate mixture in accordance with the invention may advantageously constitute a feedstock for a method in accordance with the invention, after adding or not adding water.

In general, the invention concerns the use of an additive or of an additive precursor for limiting the quantity of chromium 6 generated in a product comprising chromium 3 oxide during its manufacture and/or during its use. The use of the additive or of an additive precursor is particularly advantageous on surfaces of a product comprising chromium 3 oxide which are not exposed to temperatures of more than 1000° C. in particular on the surfaces of a product which are not in contact with molten glass, and/or when all or part of the product is exposed to temperatures in the range 100° C. to 1700° C., in particular to temperatures in the range 100° C. to 1200° C.

The invention also concerns a glass furnace comprising an additive-containing product, preferably in the form of a block, in particular a vessel block or a bottom block, a glass feeder channel, a consumable part for a glass feeder channel, also known as an "expendable" in particular a spout, an orifice ring, a sleeve, a plunger, a stirrer or a rotor.

The additive-containing product may in particular be disposed in a zone of the furnace in which it is likely to come into contact with molten glass.

Preferably, at least one region of the additive-containing product defining a surface which is not intended to come into contact with molten glass comprises the additive.

The invention also concerns a method for the manufacture of a glass furnace in accordance with the invention, the additive-containing product being manufactured in accordance with a manufacturing method in accordance with the invention.

Definitions

An "additive" in an additive-containing product is the result of any transformation, during the manufacture of the additive-containing product, of an "additive precursor" introduced into the feedstock. The nature of an additive precursor is not always modified during the manufacture of the product. The additive is then identical to the additive precursor and it is possible to call the additive precursor introduced into the feedstock the "additive".

For the purposes of clarity, a distinction is made between the "product comprising chromium 3 oxide" and the "additive-containing product", which is the product comprising chromium 3 oxide into which the additive has been incorporated and/or onto which the additive has been applied.

The term "in the core" means "distributed through the bulk".

A hardened concrete is conventionally constituted by an assembly of coarse grains with a size of more than 50 µm, typically in the range 50 µm to 25 mm, bonded by means of a matrix, said matrix providing a substantially continuous structure between the coarse grains.

For a concrete, the "granulate" designates the particles present in the feedstock at the origin of the grains in the hardened concrete. Hardening or sintering does not substantially modify the dimensions of the particles of granulate at the origin of the grains in the additive-containing product. Particles of granulate with a size of more than 50 µm, typically in the range 50 µm to 25 mm, are thus also termed "grains".

After activation, the matrix is obtained by hardening of the matrix fraction of the feedstock, constituted by "matrix particles" with a size of 50 µm or less.

The particles of the feedstock that are temporary, i.e. which are not found in the sintered product, thus do not belong to the granulate, nor to the matrix fraction. The temporary particles, the granulate and the matrix fraction together constitute the "particulate mixture".

Activation is a solidification process. The activated state conventional results from moistening a particulate mixture comprising a hydraulic binder with water or another liquid. During this process, the concrete is conventionally named "fresh concrete". In order to shape it, the fresh concrete is preferably cast, vibrocast or even sprayed.

The solid mass obtained by solidification of a fresh concrete is known as "hardened concrete". When the hardened concrete is intended to be sintered, it constitutes a "preform". Sintering the preform results in a "sintered concrete".

The term "hydraulic binder" means a binder which, during activation, generates solidification and hydraulic hardening, generally at ambient temperature. A cement is a hydraulic binder. A high alumina cement is an example of a cement. A calcium aluminate(s) cement is an example of a high alumina cement.

A "ramming mass" is a particulate mixture containing a chemical and/or ceramic and/or organic binder, which is conventionally shaped, after optional moistening, by ramming or compaction, manually or with the aid of appropriate mechanical means. Preferably, the particulate mixture is not moistened.

The "preform" obtained thereby has low mechanical strength, which makes it difficult to handle, in contrast to a hardened concrete.

A ramming mass may be unsintered, or it may be entirely or partially sintered. In particular, when the ramming mass constitutes a refractory packing, only a portion of the thickness of the ramming mass, for example the first third from the hot face, i.e. from the face that extends on the inside of the furnace, can be sintered. In an application to a steel melting furnace, in particular a crucible furnace, a ramming mass is preferably at least partially sintered.

The "granulate" of a ramming mass designates the particles present in the feedstock and having a size of more than 50 µm, typically in the range 50 µm to 25 mm. The manufacture of ramming mass does not substantially modify the dimensions of the particles of granulate, which may also be termed "grains".

The "matrix fraction" of a ramming mass designates the particles present in the feedstock, constituted by "matrix particles", i.e. with a size of 50 µm or less.

A "glass" is a non-crystalline material with a glass transition temperature of less than 1100° C.

The term "glass transition temperature" of a glass means the temperature at which the material changes from the solid state into the viscous state. The glass transition temperature can be determined by differential thermal analysis (DTA). The glass transition temperature is the temperature at which the glass has a viscosity substantially equal to $10^{12}$ Pa·s.

The term "vitroceramic" conventionally means a microcrystalline compound obtained by controlled crystallization of a "vitroceramic precursor glass".

The controlled crystallization of a vitroceramic precursor glass is conventionally carried out during a subsequent step which immediately or otherwise follows the step for obtaining said vitroceramic precursor glass.

A vitroceramic precursor glass is a glass in the solid state which, in contrast to other glasses, contains "nucleation agents".

A nucleation agent is an agent that is capable of causing the formation of microcrystallizations or "microcrystallites" during the heat treatment of controlled crystallization, usually known as "crystallization heat treatment" or "vitroceramic formation heat treatment", a microcrystallite being a crystal for which the half-sum of the length and the width is less than 10 µm. The length and width of a microcrystallite are conventionally evaluated from sectional views of the vitroceramic. The microstructure of a vitroceramic is thus constituted by microcrystallites immersed in a residual vitreous phase.

The fusion temperature of a vitroceramic material is the equilibrium temperature separating the domain in which the liquid and solid phases coexist from the domain in which only a liquid phase is present.

Fused products, i.e. manufactured by melting-freezing which, during the course of their manufacture, do not pass through a step in which they are in the glassy state, are therefore not vitroceramic materials. In particular, fused corundum, fused alumina, fused spinels, fused magnesia, fused mullite, fused mullite-zirconia, fused aluminum titanate, which may be doped, and fused nitrides are not vitroceramic materials.

The "bulk density" is conventionally defined as the ratio of the weight of the powder divided by the sum of the apparent volumes of said particles.

The "circularity" of an observed particle is the ratio $P_D/P_r$, with $P_r$ designating the perimeter of the particle as observed, and $P_D$ designating the perimeter of the disk having the same surface area as that of the particle which has been observed. The circularity depends on the direction of observation. In order to evaluate the circularity "Ci" of a particle P, the perimeter $P_D$ of the disk D having an area equal to the area $A_p$ of the particle P is determined on a photograph of that particle. In addition, the perimeter $P_r$ of this particle is determined. The circularity is equal to the ratio $P_D/P_r$. Thus, $$Ci = \frac{2*\sqrt{\pi A_p}}{Pr}.$$

The more elongate the particle, the lower is the circularity. The instruction manual for the SYSMEX FPIA 3000 also describes this procedure (see "detailed specification sheets" at www.malvern.co.uk). The percentile or "centile" 50 ($Ci_{50}$) of a set of particles is the circularity of particles corresponding to the percentage, by number, of 50% on the cumulative circularity distribution curve for the particles of this set, the circularities of the particles being classified in increasing order. 50% by number of the particles of this set have a circularity of less than $Ci_{50}$. The 50 percentile can be evaluated with the aid of an instrument of the Morphologi® G3 type marketed by Malvern. $Ci_{50}$ is then termed the "median circularity".

For the purposes of clarity, the chemical formulae of the oxides are used to designate the contents of these oxides in a composition. As an example, "$ZrO_2$", "$SiO_2$" or "$Al_2O_3$" designate the contents of these oxides and "zirconia", "silica" and "alumina" are used to designate the phases of these oxides constituted by $ZrO_2$, $SiO_2$ and $Al_2O_3$, respectively.

Unless otherwise indicated, all of the percentages relating to the composition of the feedstock, of the product comprising chromium 3 oxide, or of the additive-containing product are given by weight on the basis of the oxides.

Unless otherwise indicated, all of the percentages relating to the composition of the particulate mixture or of the matrix fraction or of the granulate are given by weight on the basis of the particulate mixture or of the matrix fraction or of the granulate respectively.

A content by weight of an oxide or of a metallic element is with respect to the total content of that element, expressed in the form of the most stable oxide, as is conventional in the industry.

DETAILED DESCRIPTION

The detailed description of step A) below relates to a concrete, but the invention encompasses any product comprising chromium 3 oxide.

In step A), the feedstock for manufacturing a concrete is constituted by mixing a particulate mixture in accordance with the invention and water, in order to obtain, at the end of step B) and/or C), an additive-containing product in accordance with the invention.

In addition to the particulate mixture and water, it may also contain a liquid shaping agent.

Particulate Mixture

The manufacture of a particulate mixture conventionally results from a mixture of powdered starting materials with compositions and granulometric distribution that are adapted to the desired additive-containing product.

For a concrete, the particulate mixture preferably comprises, as a percentage by weight, from 0.9% to 8%, preferably from 2% to 6% of particles of a hydraulic cement. The hydraulic cement may be a high alumina cement or a mixture of different cements such as CA25 or CA14 cements from Almatis. Preferably again, the hydraulic cement contains alumina and calcium aluminates as the principal constituents (constituents with the highest contents).

Preferably, the particulate mixture has a total content of $Cr_2O_3+Al_2O_3$ of more than 47%, preferably more than 51%, preferably more than 56%, preferably more than 60%, preferably more than 70%, preferably more than 75%, or even more than 80%, or even more than 85%, or even more than 89%, as a percentage by weight.

In one embodiment, the particulate mixture comprises a total content of $Cr_2O_3+Al_2O_3+MgO$ of more than 80%, preferably more than 85%, preferably more than 90%, preferably more than 95%, as a percentage by weight.

In one embodiment, the particulate mixture comprises a content of $Cr_2O_3$ of more than 13%, more than 17%, more than 21%, more than 26%, more than 30%, more than 35%, and/or less than 71%, less than 66%, or less than 62%, less than 50%, as a percentage by weight. In one embodiment, the content of $Cr_2O_3$ is more than 48%, or even more than 52%.

In one embodiment, the particulate mixture comprises a content of $Cr_2O_3$ of more than 3%, preferably more than 4%, preferably more than 5% and preferably less than 15%, preferably less than 12%, preferably less than 9%, as a percentage by weight.

In one embodiment, the particulate mixture comprises a content of $Al_2O_3$, preferably in the form of alumina, of more than 2.5%, more than 4.5%, more than 9%, more than 13%, more than 17%, more than 21% and/or less than 95%, less than 90%, less than 85%, less than 80%, less than 76%, less than 71%, less than 66%, less than 62%, less than 57%, less than 52%, or even less than 33%, as a percentage by weight. In one embodiment, the particulate mixture comprises a content of $Al_2O_3$ of more than 33%, of more than 35%, or even of more than 39%. In one embodiment, the particulate mixture comprises a content of $Al_2O_3$ of more than 70%, preferably of more than 75%, preferably of more than 80%, or even of more than 85%, or even of more than 90%.

The content of $SiO_2$, preferably as silica, of the particulate mixture may be more than 0.4%, more than 0.9%, and/or less than 11.5%, or less than 7.5%, as a percentage by weight.

The content of $ZrO_2$, preferably in the form of zirconia, of the particulate mixture may be less than 18%, less than 14.5%, and/or more than 0.9%, or more than 2.6%, as a percentage by weight.

The content of constituents other than $Cr_2O_3$, $Al_2O_3$, CaO, $ZrO_2$, MgO, $Fe_2O_3$, $SiO_2$ and $TiO_2$ of the particulate mixture is less than 20%, preferably less than 15%, preferably less than 12%, preferably less than 8%, or even less than 5%, as a percentage by weight.

In one embodiment, the content of MgO of the particulate mixture is less than 19%, preferably less than 14%, preferably less than 10%, preferably less than 5%, preferably less than 4%, preferably less than 3%, preferably less than 2%, preferably less than 1%, preferably less than 0.5%, or even less than 0.1%, as a percentage by weight.

In one embodiment, the content of MgO of the particulate mixture is more than 5%, preferably more than 7%, preferably more than 10% and less than 15%, as a percentage by weight.

In one embodiment, the content of $Fe_2O_3$ of the particulate mixture is less than 5%, preferably less than 3%, preferably less than 1%, preferably less than 0.5%, as a percentage by weight.

In one embodiment, the content of $Fe_2O_3$ of the particulate mixture is less than 30% and more than 1%, preferably more than 3%, as a percentage by weight.

In a preferred embodiment, exclusively of the additive precursor, the particulate mixture has, as a percentage by weight on the basis of the oxides:
 a content of MgO of less than 20%, preferably less than 19%, preferably less than 15%, preferably less than 14%, preferably less than 10%, preferably less than 5%, preferably less than 4%, preferably less than 3%, preferably less than 2%, preferably less than 1%, preferably less than 0.5%, or even less than 0.1%; and
 a content of $Fe_2O_3$ of less than 5%, preferably less than 3%, preferably less than 1%, preferably less than 0.5%.

The content of $TiO_2$ of the particulate mixture may be more than 0.3%, more than 0.5%, more than 0.7%, more than 1%, and/or less than 5%, less than 4.5%, less than 4%, less than 3.5%, less than 3%, as a percentage by weight. In one embodiment, the content of $TiO_2$ of the particulate mixture is less than 0.2%.

In one embodiment, the content of CaO of the particulate mixture is more than 0.2%, preferably more than 0.3%, preferably more than 0.4% and/or less than 2.4%, preferably less than 1.9%, preferably less than 1.4%, preferably less than 1%, preferably less than 0.8%, as a percentage by weight.

In one embodiment, the content of CaO of the particulate mixture is less than 0.5%, preferably less than 0.3%, as a percentage by weight.

Preferably, the total $Cr_2O_3$, $Al_2O_3$, $ZrO_2$, $SiO_2$, CaO and $TiO_2$ content in the particulate mixture is more than 77%, more than 83%, more than 87%, more than 90%, or more than 93%, as a percentage by weight.

Preferably, the constituents other than the oxides represent less than 14%, preferably less than 10%, preferably less than 8%, preferably less than 5% of the weight of the particulate mixture.

The granulometric distribution is not limiting. In particular, it may be adapted to the bulk density of the product that is to be obtained.

The particulate mixture for a concrete comprises a matrix fraction and a granulate.

Matrix Fraction

The particulate mixture preferably comprises more than 10%, more than 15%, more than 20%, or even more than 25%, and/or less than 40%, or even less than 35%, or even less than 30% of matrix particles, as a percentage by weight.

The median size of the matrix fraction may be less than 30 μm, less than 25 μm, less than 15 μm, less than 10 μm, or even less than 7 μm.

Preferably, at least 90% by weight of the matrix particles have a size of less than 40 μm, preferably less than 30 μm, preferably less than 20 μm, or even less than 10 μm.

Preferably, the matrix fraction has a chemical composition such that, as percentages by weight and for a total of 100%:
 $Cr_2O_3+Al_2O_3+ZrO_2+MgO+Fe_2O_3+SiO_2+TiO_2+CaO \geq 82\%$, preferably $Cr_2O_3+Al_2O_3+ZrO_2+MgO+Fe_2O_3+SiO_2+TiO_2+CaO \geq 87\%$, and
 $Cr_2O_3+Al_2O_3+MgO \geq 45\%$, and
 preferably, $Cr_2O_3 \geq 6\%$, and
 preferably, $15\% \geq SiO_2 \geq 0.1\%$.

Preferably, the composition of the matrix fraction is such that:
 the total $Cr_2O_3+Al_2O_3+MgO$ content is more than 60%, preferably more than 65%, preferably more than 70%, preferably more than 80%, or even more than 85%, as a percentage by weight; and/or the content of $SiO_2$ is less than 12%, preferably less than 10%, preferably less than 8%, preferably less than 6%, preferably less than 5%, or even less than 4%, or even less than 3%; and/or the content of MgO is less than 20%, preferably less than 15%, preferably less than 10%, preferably less than 5%, preferably less than 4%, preferably less than 3%, preferably less than 2%, preferably less than 1%, preferably less than 0.5%, as a percentage by weight; and/or in one embodiment, the content of $Fe_2O_3$ is less than 5%, preferably less than 3%, preferably less than 1%, preferably less than 0.5%, as a percentage by weight; and/or in one embodiment, the content of $Fe_2O_3$ is less than 30% and more than 1%, preferably more than 3%, as a percentage by weight; and/or the content of $TiO_2$ is less than 7%, or even less than 4%, or even less than 3%, or even less than 2%; and/or the complement to $Cr_2O_3$, $Al_2O_3$, CaO, $ZrO_2$, MgO, $Fe_2O_3$, $SiO_2$ and $TiO_2$ preferably represents less than 8%, preferably less than 6%, preferably less than 5%, preferably less than 4%, preferably less than 3%.

In one embodiment, the composition of the matrix fraction is such that $Cr_2O_3+Al_2O_3>73\%$, $Cr_2O_3+Al_2O_3>80\%$, or in fact $Cr_2O_3+Al_2O_3>90\%$.

In one embodiment, the composition of the matrix fraction is such that $Cr_2O_3+Al_2O_3+MgO>75\%$, $Cr_2O_3+Al_2O_3+MgO>80\%$, or in fact $Cr_2O_3+Al_2O_3+MgO>90\%$.

In one embodiment, the composition of the matrix fraction is such that $Al_2O_3+MgO>75\%$, $Al_2O_3+MgO>80\%$, or in fact $Al_2O_3+MgO>90\%$.

In one embodiment, the composition of the matrix fraction is such that the content of $TiO_2$ is less than 0.2%.

In one embodiment, the composition of the matrix fraction is such that the content of $Al_2O_3$ is more than 4%, more than 5%, more than 7.5%, more than 10%, more than 15%, and/or less than 70%, less than 65%, less than 60%, less than 50%.

The matrix fraction preferably comprises particles of eskolaite on the one hand and, on the other hand, particles of alumina and/or particles of zirconia and/or particles of titanium oxide and/or particles of silica and/or particles of cement and/or particles of additive. Preferably, the matrix fraction comprises particles of eskolaite on the one hand and, on the other hand, of alumina and/or of zirconia and/or of titanium oxide and/or of cement and/or particles of additive.

In one embodiment, the particulate mixture does not contain particles of zirconia, in particular matrix particles of zirconia.

In one embodiment, the matrix fraction preferably comprises particles of alumina on the one hand and, preferably, on the other hand, particles of eskolaite and/or particles of magnesia and/or particles of additive.

Granulate

The particulate mixture preferably comprises less than 90%, preferably less than 85%, preferably less than 80%, of grains, as a percentage by weight.

Preferably, at least 90% by weight of the grains have a size of more than 100 μm, preferably more than 200 μm, preferably more than 300 μm, preferably more than 400 μm.

Preferably again, more than 80%, more than 90%, preferably more than 95%, preferably more than 99% by weight of the grains of granulate have a size of more than 200 μm, preferably more than 300 μm, preferably more than 400 μm, or even more than 0.5 mm and/or less than 10 mm, preferably less than 5 mm.

Preferably again, the particulate mixture contains at least 10% of grains with a size of more than 2 mm, as a percentage by weight.

In one embodiment, more than 90%, more than 95% of the weight of the particulate mixture is constituted by sintered particles.

Preferably, the granulate has a bulk density of more than 85% of the theoretical density, preferably more than 88%, preferably more than 90%, preferably more than 91%, preferably more than 92% of the theoretical density, or even more than 93%, or even more than 94%, or even more than 95%, or even more than 96% of the theoretical density.

Preferably, the granulate has an open porosity of less than 10%, preferably less than 6%, preferably less than 5%, preferably less than 3%, preferably less than 2%, preferably less than 1%, or even less than 0.7%, or even less than 0.6%.

Preferably, the granulate has a median circularity of more than 0.87, preferably more than 0.88, preferably more than 0.90, preferably more than 0.91. Advantageously, the resistance to thermal shocks and the corrosion resistance, in particular in an application in which the product is brought into contact with molten glass, are improved.

The granules are particles having a circularity of 0.8 or more. Preferably, the granules are agglomerated particles, in particular sintered particles. The agglomeration may also be obtained by means of a binder, for example a polymeric binder, in particular by atomization or spray drying and/or by using a granulator or pelletizing equipment.

In a particular embodiment, at least 80%, preferably at least 90%, preferably at least 95%, preferably at least 99%, or even substantially 100% by number of the grains are granules.

The granulate is preferably constituted by particles of additives and by particles comprising $Cr_2O_3$ on the one hand and, on the other hand, comprising $Al_2O_3$ and/or $ZrO_2$ and/or MgO and/or $Fe_2O_3$ and/or $TiO_2$ and/or $SiO_2$. Preferably, the granulate is constituted by particles comprising $Cr_2O_3$ on the one hand and, on the other hand, comprising $Al_2O_3$ and/or $ZrO_2$ and/or $TiO_2$ and/or $SiO_2$.

In one embodiment, the granulate is constituted by particles of additive and by particles comprising $Al_2O_3$ and/or by particles comprising $Cr_2O_3$ and/or by particles comprising MgO and/or by particles comprising a mixture of at least two oxides selected from $Al_2O_3$, $Cr_2O_3$ and MgO. In one embodiment, the granulate is constituted by particles comprising $Al_2O_3$ and $Cr_2O_3$ on the one hand, and by particles comprising $Al_2O_3$ and/or by particles comprising MgO on the other hand. Preferably, the granulate has a chemical composition such that, as percentages by weight and for a total of 100%:

$Cr_2O_3+Al_2O_3+ZrO_2+MgO+Fe_2O_3+SiO_2+TiO_2 \geq 90\%$, preferably $Cr_2O_3+Al_2O_3+ZrO_2+MgO+Fe_2O_3+SiO_2+TiO_2 \geq 95\%$, and $Cr_2O_3+Al_2O_3+MgO \geq 60\%$, and preferably $Cr_2O_3 \geq 9\%$, and preferably $20\% \geq SiO_2 \geq 0.5\%$.

Preferably, the composition of the granulate is such that the total $Cr_2O_3+Al_2O_3+MgO$ content is more than 65%, preferably more than 70%, preferably more than 80%, or even more than 90%, or even more than 92%, or even more than 94%, as a percentage by weight; and/or the content of $SiO_2$ is less than 16%, preferably below 13%, preferably less than 10%, preferably less than 8%, preferably less than 6%, preferably less than 5%, or even less than 4%, or even less than 3% (advantageously, the densification is improved thereby, without in any way reducing the corrosion resistance); and/or in one embodiment, the content of MgO is less than 20%, preferably less than 15%, preferably less than 10%, preferably less than 5%, preferably less than 4%, preferably less than 3%, preferably less than 2%, preferably less than 1%, preferably less than 0.5%, as a percentage by weight; and/or in one embodiment, the content of MgO is more than 1%, preferably more than 3% and less than 20%, preferably less than 10%; and/or in one embodiment, the content of MgO is less than 1%, preferably less than 0.8%; and/or in one embodiment, the content of $Fe_2O_3$ is less than 5%, preferably less than 3%, preferably less than 1%, preferably less than 0.5%, as a percentage by weight on the basis of the oxides; and/or in one embodiment, the content of $Fe_2O_3$ is less than 30% and more than 1%, preferably more than 3%, as a percentage by weight; and/or in one embodiment, the content of $TiO_2$ is more than 0.5%, or even more than 0.7%, and/or less than 4%, preferably less than 3%, less than 2.2%, or even less than 2%; and/or the complement to $Cr_2O_3$, $Al_2O_3$, CaO, $ZrO_2$, MgO, $Fe_2O_3$, $SiO_2$ and $TiO_2$ preferably represents less than 5%, preferably less than 4%, preferably less than 3%, preferably less than 2%, preferably less than 1%.

In certain embodiments, the composition of the granulate is such that $Cr_2O_3+Al_2O_3>80\%$, $Cr_2O_3+Al_2O_3>90\%$, or in fact $Cr_2O_3+Al_2O_3>95\%$.

Preferably again, the sum of the contents of the oxides in the grains, preferably the granules of the granulate, represents more than 90%, more than 95%, or even substantially 100% of the weight of said grains or granules.

Shaping Agent

The particulate mixture may contain at least 0.1% and/or less than 6% by weight of particles of a shaping agent, as a percentage by weight on the basis of the particulate mixture.

The optional shaping agent may be introduced in the liquid form in equivalent quantities.

The shaping agent may in particular be selected from the group constituted by:
- clays;
- plasticizers, such as polyethylene glycol (or "PEG") or polyvinyl alcohol (or "PVA");
- binders including temporary organic binders such as resins, lignosulfonates, carboxymethylcellulose or dextrin;
- deflocculating agents such as alkali metal polyacrylates, or polycarboxylates; and
- mixtures of these agents.

Preferably, the shaping agent is selected from the group constituted by deflocculating agents, clays, lignosulfonates, PVA and their mixtures.

Additive and Additive Precursor

The median size of the powdered additive or, more generally, of the powdered additive precursor, in the particulate mixture is preferably less than 150 µm, preferably less than 100 µm, preferably less than 80 µm, preferably less than 60 µm, preferably less than 50 µm, preferably less than 40 µm, preferably less than 30 µm, or even less than 20 µm.

Preferably, the content of additive or, more generally, of additive precursor in the particulate mixture, on the basis of the weight of the particulate mixture exclusively of the shaping agent, is more than 0.1%, preferably more than 0.2%, preferably more than 0.3%, preferably more than 0.4%, preferably more than 0.5%, and preferably less than 6%, preferably less than 5%, preferably less than 4%, preferably less than 3%.

Preferably, the content of the additive or, more generally, of the additive precursor in the particulate mixture is adjusted in a manner such that the quantity of additive in the additive-containing product is more than 0.3%, on the basis of the weight of the additive-containing product.

In a first preferred embodiment, the quantity of additive or, more generally, of additive precursor in the particulate mixture, is adjusted in a manner such that the quantity of additive in the additive-containing product (preform or sintered product) is more than 0.1%, preferably more than 0.2%, preferably more than 0.3%, preferably more than 0.4%, preferably more than 0.5%, and less than 6%, preferably less than 5%, preferably less than 4%, preferably less than 3%, on the basis of the weight of the additive-containing product. Preferably in this embodiment, the additive or, more generally, the additive precursor, is selected from phosphorus compounds other than glasses and vitroceramics, tungsten compounds other than glasses and vitroceramics, molybdenum compounds other than glasses and vitroceramics, glasses comprising elemental iron, boron nitride and their mixtures. Preferably the additive or, more generally, the additive precursor is selected from phosphorus compounds other than glasses and vitroceramics, tungsten oxides, molybdenum oxides, boron nitride and their mixtures; preferably, the additive or, more generally, the additive precursor, is selected from $FePO_4$, $MgPO_4$, $ZnPO_4$, $CuPO_4$, phosphoric acid, tungsten oxides, molybdenum oxides and their mixtures, preferably from $FePO_4$, $MgPO_4$, phosphoric acid and their mixtures. Preferably, the additive or, more generally, the additive precursor, is selected from $FePO_4$, $MgPO_4$ and their mixtures.

This first embodiment is particularly suitable when the additive-containing product is intended to be subjected to a temperature in the range 100° C. to 400° C.

In a second preferred embodiment, the quantity of additive or, more generally, the quantity of additive precursor incorporated into the particulate mixture, is adjusted in a manner such that the additive content in the additive-containing product is more than 0.1%, preferably more than 0.2%, preferably more than 0.3%, preferably more than 0.4%, preferably more than 0.5%, and less than 6%, preferably less than 5%, preferably less than 4%, preferably less than 3%, on the basis of the weight of the additive-containing product. Preferably, in this embodiment, the additive or, more generally, the additive precursor, is selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures. Preferably in this embodiment, the additive or, more generally, the additive precursor, is selected from phosphorus compounds other than glasses and vitroceramics, tungsten oxides, molybdenum oxides, and their mixtures, preferably from $FePO_4$, $MgPO_4$, $ZnPO_4$, $CuPO_4$, phosphoric acid, tungsten oxides, molybdenum oxides, and their mixtures. Preferably the additive or, more generally, the additive precursor, is selected from $FePO_4$, $MgPO_4$, phosphoric acid and their mixtures. Preferably, the additive or, more generally, the additive precursor, is selected from $FePO_4$, $MgPO_4$ and their mixtures.

This second embodiment is particularly suitable when the additive-containing product is intended to be subjected to a temperature in the range 500° C. to 1200° C.

The introduction of the additive or, more generally, of the additive precursor in step A), can advantageously be used to obtain a substantially homogeneous distribution of the additive. Preferably, the mixing time is determined to have this effect.

The particles of additive or, more generally, of additive precursor are accounted for, as a function of their size, in the granulate or the matrix fraction.

The particulate mixture may be supplied in a ready-to-use form. For a concrete in particular, it merely suffices to mix it with water in order to prepare the feedstock.

Water

The quantity of water is a function of step B).

In the case of casting, an addition of a quantity of water in the range 3% to 7% as a percentage by weight on the basis of the particulate mixture, optionally containing additive, is preferred.

In contrast to the feedstock for the manufacture of a concrete, the feedstock for the manufacture of a ramming mass does not include a hydraulic binder, and thus is not activated by any moisture. However, it may comprise a chemical and/or ceramic and/or organic binder. The means for activation are determined as a consequence.

In step B), any of the conventional methods used for the manufacture of preforms, in particular manufactured from a hardened concrete, may be envisaged.

The feedstock may in particular be shaped in situ, and so the preform is placed in its service position.

In particular for a ramming mass, shaping may conventionally result from a vibration or ramming operation. The preform obtained thus has a low mechanical strength, and thus is preferably manufactured in situ. Conventionally, after unmolding, the preform "holds together", but does not have the physical integrity which would allow it to be transported, for example.

In one embodiment, the additive or, more generally, the additive precursor, is applied to the surface of the preform. Any technique which is known for depositing a composition onto a block may be used, in particular deposition using a trowel or brush, or wet or dry spraying, such as a glaze, so that a thin or thick film is formed.

Preferably, the additive or, more generally, the additive precursor, is mixed with a liquid, for example water and/or an oil, before depositing it onto the surface. The quantity of liquid can vary and is a function of the granulometry of the additive or, more generally, of the additive precursor, in order to key it well onto the surface.

In a third preferred embodiment, the quantity of additive or, more generally, of additive precursor, deposited in step B) onto the preform or in step C) onto the sintered product, is adjusted in a manner such that the additive content in the additive-containing product is more than 0.01%, preferably more than 0.015%, preferably more than 0.02%, and less than 5%, preferably less than 4%, preferably less than 3%, preferably less than 2%, preferably less than 1.5%, preferably less than 1%, on the basis of the weight of the additive-containing product. Preferably in this embodiment, the additive or, more generally, the additive precursor, is selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures. Preferably, the additive or, more generally, the additive precursor, is selected from phosphorus compounds other than glasses and vitroceramics, tungsten oxides, molybdenum oxides, glasses comprising elemental iron and their mixtures, preferably selected from $FePO_4$, $MgPO_4$, $ZnPO_4$, $CuPO_4$, phosphoric acid, tungsten oxides, molybdenum oxides, boron nitride, glasses comprising elemental iron and their mixtures. Preferably, the additive or, more generally, the additive precursor, is selected from $FePO_4$, $MgPO_4$, phosphoric acid, tungsten oxides, molybdenum oxides, glasses comprising elemental iron, preferably glasses comprising an iron content, expressed in the form of $Fe_2O_3$, in the range 1% to 15%, preferably in the range 4% to 15%, and their mixtures, preferably from $FePO_4$, $MgPO_4$, tungsten oxides, molybdenum oxides, glasses comprising elemental iron, preferably glasses comprising an iron content, expressed in the form of $Fe_2O_3$, in the range 1% to 15%, preferably in the range 4% to 15%, and their mixtures.

This third embodiment is particularly suitable when the product is intended to be subjected to a temperature in the range 100° C. to 1000° C., or even a temperature in the range 100° C. to 850° C., and a reduction in the quantity of chromium 6 over at least one of the faces of the product is desired.

In one embodiment, a bonding agent is mixed with the additive or, more generally, with the additive precursor, to promote its deposition onto the surface of the product. The bonding additives may be selected from clays, plasticizers, celluloses and their mixtures, polyvinyl alcohols or "PVA", polyethylene glycols or "PEG".

In step C), which is optional, the conditions for sintering, and in particular the temperature for sintering, depend on the composition of the particulate mixture. Normally, a sintering temperature in the range 1400° C. to 1700° C., preferably in the range 1450° C. to 1650° C., preferably in the range 1500° C. to 1600° C., is highly suitable. The sintering may be carried out in situ, i.e. after the preform has been shaped or placed in its service position.

At the end of step C), a sintered product in accordance with the invention is obtained, in particular a sintered concrete or a sintered ramming mass.

In one embodiment, the additive or, more generally, the additive precursor, is applied to the surface of the sintered product. The techniques described for applying the additive in step B) are applicable.

EXAMPLES

In order to manufacture the "$Cr_2O_3$, $Al_2O_3$, $SiO_2$, $TiO_2$" particles used in the products of Examples 1 to 4 and 7 to 12, the following starting materials were used:

chromium oxide $Cr_2O_3$ pigment with a purity of more than 95%, having a specific surface area equal to 4 $m^2/g$ and a median size of 0.7 µm;

alumina, $Al_2O_3$, with a purity of more than 99%, having a specific surface area equal to 7 $m^2/g$ and a median size of 0.6 µm;

fumed silica, with a purity of more than 92%; and titanium oxide, in the form of rutile, with a purity of more than 93% and having a median size of 1.5 µm.

These starting materials were measured out and mixed in a manner such as to obtain a mixture of oxides having the following chemical composition:

TABLE 1

| Chemical analysis | |
|---|---|
| $Cr_2O_3$ (%) | 40.0 |
| $Al_2O_3$ (%) | 48.0 |
| $SiO_2$ (%) | 3.2 |
| $TiO_2$ (%) | 1.70 |
| $ZrO_2$ (%) | 6.00 |
| Others (%) | 1.10 |

For each example, 3000 g of oxide mixture, 350 g of water and 150 g of polyvinyl alcohol (PVA) were introduced into an Eirich RV02 mixer.

This was then all mixed for 1 minute with a head rotating at 300 rpm and a pan adjusted to 43 rpm in order to obtain a homogeneous mixture. The rotation rate of the head was then increased to 1050 rpm, and a supplemental quantity of 900 grams of oxide mixture was then added steadily over one minute. The rotation was maintained for 2 minutes after introduction of the supplemental quantity was complete. The particles were then discharged, dried in air for 24 h at 110° C. before being sintered at 1550° C. with a constant temperature stage of 3 hours, in air, with a temperature ramp-up rate and a temperature ramp-down rate of 50° C./h. After sintering, the particles had an open porosity equal to 1.05% and a median circularity of more than 0.85. They were then sieved and three granulometric fractions were retained: 0-0.5 mm, 0.5-2 mm, and 2-5 mm.

The hardened concretes of Examples 2 and 3, and 7 to 12 were then manufactured in accordance with steps A) and B) described above.

In step A), the following starting materials were then mixed with the "$Cr_2O_3$, $Al_2O_3$, $SiO_2$, $TiO_2$" particles:

chromium oxide $Cr_2O_3$ pigment with a purity of more than 95%, having a specific surface area equal to 4 $m^2$/g and a median size of 0.7 µm, alumina, $Al_2O_3$, with a purity of more than 99%, having a specific surface area equal to 7 $m^2$/g, and a median size of 0.6 µm, a high alumina cement, CA25R from Almatis.

The contents by weight of the different starting materials are summarized in Table 2 below:

TABLE 2

| | |
|---|---|
| "$Cr_2O_3$, $Al_2O_3$, $SiO_2$, $TiO_2$" particles, 2-5 mm | 28.5% |
| "$Cr_2O_3$, $Al_2O_3$, $SiO_2$, $TiO_2$" particles, 0.5-2 mm | 26.5% |
| "$Cr_2O_3$, $Al_2O_3$, $SiO_2$, $TiO_2$" particles, 0-0.5 mm | 23.5% |
| Chromium oxide pigment | 15.5% |
| Alumina | 5% |
| High alumina cement CA25R | 1% |

A modified polycarboxylate ether was then added in a quantity equal to 0.17% of the weight of said mixture of starting materials.

An additive precursor was then added, in accordance with the invention, in a manner such as to obtain a ready-to-use mixture. The nature and the quantity of the additive precursor are summarized in Table 3 below:

TABLE 3

| | Nature of additive precursor | Quantity of additive precursor, as a percentage on the basis of the weight of the ready-to-use mixture |
|---|---|---|
| Example 2 | Tungsten oxide, $WO_3$ | 0.5% |
| Example 3 | Iron phosphate, $FePO_4$ | 1% |
| Example 7 | Tungsten oxide, $WO_3$ | 1% |
| Example 8 | Silicon carbide, SiC | 0.5% |
| Example 9 | Iron phosphate, $FePO_4$ | 0.5% |
| Example 10 | Alloy of aluminum and silicon, AlSi | 0.5% |
| Example 11 | Glass comprising iron | 0.5% |
| Example 12 | Glass comprising iron | 1% |

The tungsten oxide used had a purity of more than 99% and a median size equal to 35 µm.

The iron phosphate used was the iron phosphate E53-98 marketed by Budenheim.

The silicon carbide used was a Sika Unikiln FCP07 powder marketed by Saint-Gobain Silicon Carbide.

The alloy of aluminum and silicon had a content by weight of silicon equal to 12.3%, a content of elements other than silicon and aluminum of less than 1.5%, and a median size equal to 40 µm.

The glass powder comprising iron had a median size equal to 13 µm, and the following chemical analysis: $SiO_2$=56.1%, $Fe_2O_3$=9%, $Al_2O_3$=17.4% $Na_2O$=2.4%, $K_2O$=1.7%, CaO=7.9%, MgO=3.8%, $TiO_2$=1.2%, others=0.5%. 4.5% of water, as a percentage by weight on the basis of the weight of the ready-to-use mixture, was added in order to produce the feedstock. The mixing time was 12 minutes.

In step B), the feedstock was shaped using a vibrocasting technique into the form of a hardened concrete in accordance with the invention, with dimensions equal to 230× 150×80 $mm^3$, which were suitable for the characterizations to be carried out.

Comparative Example 1 was manufactured in a manner identical to Examples 2 and 3, and 7 to 12, but no additive precursor was added.

Example 4 was a hardened concrete identical to the hardened concrete of Example 1, with the exception that one of its faces had been coated with additive precursor having the composition shown in Table 4 below:

TABLE 4

| | Composition of additive precursor, as a percentage by weight on the basis of the total weight of additive precursor |
|---|---|
| Glass comprising iron | 77.5% |
| Silicon carbide 36-70 | 6.2% |
| Silicon carbide 80-180 | 6.2% |
| Silicon carbide 220 F. | 6.2% |
| Aluminum triphosphate | 2.9% |
| Phosphoric acid, $H_3PO_4$ | 1% |

The glass powder comprising iron had a median size equal to 13 µm, and the following chemical analysis: $SiO_2$=56.1%, $Fe_2O_3$=9%, $Al_2O_3$=17.4% $Na_2O$=2.4%, $K_2O$=1.7%, CaO=7.9%, MgO=3.8%, $TiO_2$=1.2%, others=0.5%. The silicon carbide powders had a purity of more than 98%. The aluminum triphosphate powder was a M13-01 powder from Budenheim.

The components of the additive precursor were mixed together, and 29% of water, on the basis of the total quantity of additive precursor, was added. The total mixing time was 10 minutes, in order to form a coating.

The test samples of Examples 1 and 4 were in the form of cylinders with a height equal to 50 mm and a diameter equal to 150 mm. For Example 4, the coating was applied was applied with a trowel to one of the two faces with a diameter equal to 150 mm and the total quantity of additive, on the basis of the weight of the coated sample, was equal to 4%.

The product of Example 5 was manufactured in accordance with steps A) and B) described above, starting from the following starting materials:
chromium oxide $Cr_2O_3$ pigment with a purity of more than 95%, having a specific surface area equal to 4 $m^2/g$ and a median size of 0.7 μm,
titanium oxide, in the form of rutile, with a purity of more than 93% and having a median size of 1.5 μm,
"high chromium 3 oxide content" particles containing 98% $Cr_2O_3$ and having an open porosity of less than 3%,
zirconia with a purity of more than 99% and having a median size equal to 3.5 μm,
a tungsten oxide, $WO_3$, with a purity of more than 99% and having a median size equal to 35 μm.

The weight contents of the various starting materials are summarized in Table 5 below:

TABLE 5

| | |
|---|---|
| "high chromium 3 oxide content" particles, 2-4 mm | 12.1 |
| "high chromium 3 oxide content" particles, 0.5-2 mm | 31.9 |
| "high chromium 3 oxide content" particles, 0-0.5 mm | 37.4 |
| Chromium oxide pigment | 10.1 |
| Titanium oxide | 0.4 |
| Zirconia | 8.1 |

The order in which the starting materials were introduced was as follows: a hydroxyethyl methyl cellulose, Tylose MH 4000 P2, marketed by Shin Etsu, and a calcium lignosulfonate, BRETAX C marketed by Brenntag, in a quantity equal to 0.2% and 0.5%, respectively, were added to 2.5% of water, the percentages being percentages of the total weight of the starting materials, including the additive. The particles with a high chromium 3 oxide content were then added and mixing was carried out for 10 minutes. The chromium oxide pigment, the zirconia, the titanium oxide and 1% of tungsten oxide $WO_3$ were then added, and mixing was carried out for an additional 10 minutes in order to produce the feedstock. The quantity of tungsten oxide used was as a percentage by weight on the basis of the weight of particles with a high chromium 3 oxide content, the chromium oxide pigment, the zirconia and the titanium oxide.

In step B), the feedstock was shaped, using a compression technique under a pressure equal to 800 bar, into the form of an additive-containing product with dimensions equal to 230×114×35 $mm^3$, which were suitable for the characterizations to be carried out.

Comparative Example 6 was produced in a manner identical to that of Example 5, without tungsten oxide.

The samples of Examples 5 and 6 to be tested were in the form of cylinders with a height equal to 50 mm and a diameter equal to 150 mm.

The product of Example 13 was manufactured in accordance with step A) and shaped in accordance with step B) described above.

In step A), the following starting materials were mixed:
fused alumina-chromium oxide particles comprising a $Cr_2O_3$ content equal to 13% and an alumina content equal to 82%,
electrofused alumina with a purity of more than 99%,
magnesia with a purity of more than 96% and having a median size equal to 35 μm,
iron phosphate, E53-98 marketed by Budenheim.

The contents by weight of the different starting materials are summarized in Table 6 below:

TABLE 6

| | |
|---|---|
| Fused alumina-chromium oxide particles, 5-10 mm | 20% |
| Fused alumina-chromium oxide particles, 1-5 mm | 20% |
| Electrofused alumina, 0.5-1 mm | 10% |
| Electrofused alumina, 0-0.5 mm | 22% |
| Electrofused alumina, <0.15 mm | 8% |
| Electrofused alumina, <50 μm having a median size equal to 15 μm | 5% |
| Fused alumina-chromium oxide particles, <50 μm having a median size equal to 15 μm | 5% |
| Magnesia, <75 μm | 10% |

Dextrin was then added in a quantity equal to 0.5% of the weight of said mixture of starting materials.

0.5% of iron phosphate E53-98 marketed by Budenheim was then added, the quantity of iron phosphate being as a percentage on the basis of the fused alumina-chromium oxide particles, of electrofused alumina and of magnesia, in a manner such as to obtain a ready-to-use mixture.

3% of water, as a percentage by weight on the basis of the weight of the ready-to-use mixture, was then added in a manner such as to produce the feedstock. The mixing time was 15 minutes.

In step B), the feedstock was shaped using a uniaxial compression technique at a pressure equal to 800 $kg/cm^2$ in a manner such as to obtain an additive-containing product in accordance with the invention having dimensions equal to 230×150×80 $mm^3$, which were suitable for the characterizations to be carried out.

Comparative Example 14 was produced in a manner identical to that of Example 13, but no additive was added.

Measurement Protocols

The bulk density and the open porosity of the products were measured by hydrostatic weighing.

The measurements of the bulk density and of the open porosity of a granulate were carried out in accordance with the following method:

Drying at 110° C. for at least 12 hours, of 4 samples of 35 grams, each constituted by particles the size of which was in the range 2 to 5 mm. The dry weight of each of the samples was denoted $Ps_1$, $Ps_2$, $Ps_3$ and $Ps_4$. Note that $Ps=Ps_1+Ps_2+Ps_3+Ps_4$.

Placing each sample in a flask.

With the aid of a vacuum pump, generating a vacuum of at least 0.07 MPa in each of the flasks and maintaining this vacuum for 7 minutes. Next, introducing water into the flask in a manner such as to cover the particles with at least 2 cm of water, allowing the particles to be permanently covered with water when subsequently being placed under vacuum.

Regenerating a vacuum of 0.08 MPa in each flask containing the particles and the water, and maintaining this vacuum for 7 minutes. Breaking the vacuum.

Regenerating a vacuum of 0.08 MPa in each flask, and maintaining this vacuum for 7 minutes. Breaking the vacuum.

Regenerating a vacuum of 0.08 MPa in each flask, and maintaining this vacuum for 7 minutes. Breaking the vacuum.

Determining the immersed weight of each sample, $Pi_1$, $Pi_2$, $Pi_3$ and $Pi_4$. Note that $Pi=Pi_1+Pi_2+Pi_3+Pi_4$.

Next, pouring the contents of the 4 flasks onto a sieve with a 2 mm square mesh in order to eliminate the water.

Next, pouring the particles onto a dry cotton fabric in order to eliminate excess water and draining the particles until the moist sheen has disappeared from their surface.

Determining the moist weight Ph of the assembly of particles.

The bulk density of the assembly of particles is equal to Ps/(Ph−Pi).

The open porosity of the assembly of particles is equal to (Ph−Ps)/(Ph−Pi).

These measurements correspond to averaged measurements for the material constituting the particles, i.e. do not take the interstices between the different particles into account.

The median circularity of a set of particles of a granulate was evaluated using the following method:

A sample of particles with sizes in the range 0.5 to 2 mm was poured onto the glass plate of a Morphologi® G3 instrument marketed by Malvern provided for this purpose. The selected magnification was 1×. The analysis was commenced. In order to avoid counting any scratches on the glass plate and dust, the measurements corresponding to particles with a width of less than 0.4 mm were eliminated from the count by generating a filter ("width<400"). The number of particles counted after filtration was more than 250.

The instrument provided an evaluation of the distribution of the circularity, the particles being counted by number.

For the elements other than chromium 6, the chemical analysis of the products was carried out using Inductively Coupled Plasma or ICP for the elements the quantity of which did not exceed 0.5%. In order to determine the content of the other elements, a bead of the product to be analyzed was manufactured by melting the product, then the chemical analysis was carried out using X ray fluorescence.

The measurements of the chromium 6 contents were carried out by extraction by leaching in accordance with the NF standard EN12457-2, the quantity of $Cr^{6+}$ then being measured by an analysis using liquid phase ion chromatography.

In order to measure the capability of a product of generating chromium 6, two tests were carried out as a function of the location of the additive: a test when the additive is located within the product (Examples 2, 3, 5 and 7 to 13), and a test when the additive is located at the surface of the product (Example 4). The same test was carried out on a cylinder of the same product containing no additive (Examples 1, 6 and 14).

The test when the additive was located within the product was as follows: samples of the products to be tested were placed in a curing oven. They were then heated to a temperature T in air, the time over which the temperature T was maintained being equal to 24 hours, the temperature T ramp-up rate being equal to 50° C./h and the temperature ramp-down rate being equal to 50° C./h. After the test, the chromium 6 content was determined.

The test when the additive was located on a surface of the product was as follows. The cylinder of Example 4 was disposed in a tube furnace with an internal diameter equal to 150 mm, in a manner such as to substantially block a portion of the tube, the coated face being orientated on the side for introducing an alkaline mist of a solution of 0.5 g/L of NaOH, injected into the furnace at a flow rate of 32 mg/h and per m³ available in the furnace, over 24 hours, said furnace being maintained at a temperature of 800° C. during the injection of the alkaline mist. The same test was carried out on a cylinder of the same product wherein the faces had not been coated with additive (Example 1). The varying degrees to which a yellow color was present on the large face of the product oriented on the side where the alkaline mist was introduced was related to the presence of chromate: the more intense the yellow color, the large the quantity of chromate.

Table 7 below summarizes the results obtained for Examples 1 to 3, and 5 to 14.

TABLE 7

| Example | 1(*) | 2 | 3 | 5 | 6(*) | 7 | 8 | 9 | 10 |
|---|---|---|---|---|---|---|---|---|---|
| Chemical analysis of product comprising chromium oxide 3 pigment (exclusively of the additive) (%) | | | | | | | | | |
| $Cr_2O_3$ | 46.5 | 46.5 | 46.5 | 89.3 | 89.3 | 46.5 | 46.5 | 46.5 | 46.5 |
| $Al_2O_3$ | 44.8 | 44.8 | 44.8 | 0.1 | 0.1 | 44.8 | 44.8 | 44.8 | 44.8 |
| CaO | 0.3 | 0.3 | 0.3 | 0.05 | 0.05 | 0.3 | 0.3 | 0.3 | 0.3 |
| $SiO_2$ | 2.1 | 2.1 | 2.1 | 0.05 | 0.05 | 2.1 | 2.1 | 2.1 | 2.1 |
| MgO | 0 | 0 | 0 | 0 | 0 | 0 | 0 | 0 | 0 |
| $Fe_2O_3$ | 0.3 | 0.3 | 0.3 | 0.1 | 0.1 | 0.3 | 0.3 | 0.3 | 0.3 |
| $ZrO_2$ | 4.2 | 4.2 | 4.2 | 8 | 8 | 4.2 | 4.2 | 4.2 | 4.2 |
| $TiO_2$ | 1.3 | 1.3 | 1.3 | 2.1 | 2.1 | 1.3 | 1.3 | 1.3 | 1.3 |
| $Cr_2O_3 + Al_2O_3 + CaO + ZrO_2 + MgO + Fe_2O_3 + SiO_2 + TiO_2$ | 99.5 | 99.5 | 99.5 | 99.7 | 99.7 | 99.5 | 99.5 | 99.5 | 99.5 |
| $Cr_2O_3 + Al_2O_3 + MgO$ | 91.3 | 91.3 | 91.3 | 89.4 | 89.4 | 91.3 | 91.3 | 91.3 | 91.3 |
| Other oxides | 0.5 | 0.5 | 0.5 | 0.3 | 0.3 | 0.5 | 0.5 | 0.5 | 0.5 |
| Other characteristics | | | | | | | | | |
| Bulk density (g/cm³) | 3.55 | 3.55 | 3.55 | 4.31 | 4.32 | 3.53 | 3.57 | 3.56 | 3.55 |
| Open porosity (%) | 15.7 | 16.2 | 16 | 15.3 | 15 | 16.2 | 16.2 | 15.2 | 16 |
| Chromium 6 content after test at T = 400° C. (ppm) | 690 | 390 | 210 | 90 | 280 | 250 | 430 | 230 | 500 |
| Reduction in the chromium 6 content with respect to Example 1 | — | 43.5% | 69.6% | — | — | 63.8% | 37.7% | 66.7% | 27.5% |
| Reduction in the chromium 6 content with respect to Example 6 | — | — | — | 67.9% | — | — | — | — | — |

TABLE 7-continued

| | | | | | | | | |
|---|---|---|---|---|---|---|---|---|
| Chromium 6 content after test at T = 800° C. (ppm) | 870 | 460 | 100 | — | — | 190 | 280 | 210 | 390 |
| Reduction in the chromium 6 content with respect to Example 1 | — | 47.1% | 88.5% | — | — | 78.2% | 67.8% | 75.9% | 55.2% |
| Chromium 6 content after test at T = 600° C. (ppm) | — | — | — | — | — | — | — | — | — |
| Reduction in the chromium 6 content with respect to Example 14 | — | — | — | — | — | — | — | — | — |

| Example | 11 | 12 | 13 | 14(*) |
|---|---|---|---|---|
| *Chemical analysis of product comprising chromium oxide 3 pigment (exclusively of the additive) (%)* | | | | |
| $Cr_2O_3$ | 46.5 | 46.5 | 5.9 | 5.9 |
| $Al_2O_3$ | 44.8 | 44.8 | 81.1 | 81.1 |
| CaO | 0.3 | 0.3 | 0.6 | 0.6 |
| $SiO_2$ | 2.1 | 2.1 | 0.3 | 0.3 |
| MgO | 0 | 0 | 9.9 | 9.9 |
| $Fe_2O_3$ | 0.3 | 0.3 | 0.5 | 0.5 |
| $ZrO_2$ | 4.2 | 4.2 | 0 | 0 |
| $TiO_2$ | 1.3 | 1.3 | 0 | 0 |
| $Cr_2O_3 + Al_2O_3 + CaO + ZrO_2 + MgO + Fe_2O_3 + SiO_2 + TiO_2$ | 99.5 | 99.5 | 98.3 | 98.3 |
| $Cr_2O_3 + Al_2O_3 + MgO$ | 91.3 | 91.3 | 96.9 | 96.9 |
| Other oxides | 0.5 | 0.5 | 1.7 | 1.7 |
| *Other characteristics* | | | | |
| Bulk density (g/cm³) | 3.51 | 3.58 | 3.00 | 3.00 |
| Open porosity (%) | 17.9 | 16.2 | 19 | 19.2 |
| Chromium 6 content after test at T = 400° C. (ppm) | 490 | 320 | — | — |
| Reduction in the chromium 6 content with respect to Example 1 | 29% | 53.6% | — | — |
| Reduction in the chromium 6 content with respect to Example 6 | — | — | — | — |
| Chromium 6 content after test at T = 800° C. (ppm) | 600 | 500 | — | — |
| Reduction in the chromium 6 content with respect to Example 1 | 31% | 42.5% | — | — |
| Chromium 6 content after test at T = 600° C. (ppm) | — | — | 150 | 300 |
| Reduction in the chromium 6 content with respect to Example 14 | — | — | 50% | — |

(*)comparative examples

A comparison of the product of Example 1, exclusively of the invention, with the additive-containing products of Examples 2 and 3 and 7 to 12, in accordance with the invention, shows that the additive-containing products of Examples 2 and 3 and 7 to 12 have a far weaker aptitude for generating a quantity of chromium 6 than the product of Example 1 after exposure for 24 hours to a temperature equal to 400° C. or 800° C.

A comparison of the products of Examples 1 to 3 and 7 to 12 demonstrates the effectiveness of the invention when the additive is distributed in the product in a substantially homogeneous manner.

Furthermore, after the test, the additive-containing product of Example 4 did not have a yellow coloration on the coated surface disposed inside the furnace, in contrast to the product of Example 1.

A comparison of the products of Examples 1 and 4 demonstrates the efficiency of the invention when the additive is disposed on a surface of the product.

A comparison of the additive-containing product of Example 5, in accordance with the invention, with the product of Example 6, not in accordance with the invention, shows that the additive-containing product of Example 5 has a far weaker capability of generating a quantity of chromium 6 than the product of Example 1 after exposure for 24 hours to a temperature equal to 400° C.

A comparison of the product of Example 14, not in accordance with the invention, with the additive-containing product of Example 13, in accordance with the invention, shows that the additive-containing product of Example 13 has a far weaker capability of generating a quantity of chromium 6 than the product of Example 1 after exposure for 24 hours to a temperature equal to 600° C.

As can clearly be seen here, the invention can be used to reduce the capability of a product, and in particular a concrete, for generating chromium 6 during its manufacture or its use, in particular at temperatures in the range 100° C. to 1200° C.

Clearly, the invention is not limited by the examples, which are provided solely for the purposes of illustration.

The invention claimed is:

1. A glass furnace comprising an additive-containing product comprising, exclusively at the surface, an additive selected from:
   phosphorus compounds other than glasses and vitroceramics,
   WC, $MoO_3$,
   silicon carbide,
   boron carbide,
   silicon nitride,
   boron nitride, glasses comprising elemental phosphorus and/or iron and/or tungsten and/or molybdenum, vitroceramics comprising elemental phosphorus and/or iron and/or tungsten and/or molybdenum, and their mixtures, said additive-containing product, without taking into account said additive, having the following chemical analysis, as a percentage by weight on the basis of the oxides:

$Cr_2O_3 \geq 2\%$, and $Cr_2O_3+Al_2O_3+CaO+ZrO_2+MgO+Fe_2O_3+SiO_2+TiO_2 \geq 90\%$, and $Cr_2O_3+Al_2O_3+MgO \geq 60\%$, the content by weight of additive being in the range 0.01% 6% on the basis of the additive-containing product.

2. The glass furnace as claimed in claim 1, wherein the additive-containing product is in the form of a block.

3. The glass furnace as claimed in claim 1, wherein the additive-containing product is disposed in a zone of the furnace in which, in service, said additive-containing product is in contact with molten glass.

4. The glass furnace as claimed in claim 1, wherein the additive-containing product, without taking into account said additive, has a $Cr_2O_3$ content of 9%, as percentages by weight on the basis of the oxides.

5. The glass furnace as claimed in claim 1, wherein the additive-containing product, without taking into account said additive, has, as percentages by weight on the basis of the oxides:
   a content of $Cr_2O_3$ of more than 15% and less than 98%; and/or
   a content of CaO of more than 0.1% and less than 3%; and/or
   a content of $Cr_2O_3+Al_2O_3$ of more than 55%; and/or
   a content of $SiO_2$ of more than 0.5% and less than 12%; and/or
   a content of $ZrO_2$ of more than 1% and less than 19%; and/or
   a content of MgO of less than 20%; and/or
   a content of $Fe_2O_3$ of less than 30%; and/or
   a content of constituents other than $Cr_2O_3$, $Al_2O_3$, CaO, $ZrO_2$, MgO, $Fe_2O_3$, $SiO_2$ and $TiO_2$ of less than 5%.

6. The glass furnace as claimed in claim 1, wherein the additive-containing product, without taking into account said additive, has, as percentages by weight on the basis of the oxides:
   a content of $Cr_2O_3$ of more than 30%; and/or
   a content of CaO of more than 0.3% and less than 1.5%; and/or
   a content of $Cr_2O_3+Al_2O_3$ of more than 80%; and/or
   a content of $SiO_2$ of more than 1% and less than 8%; and/or
   a content of $ZrO_2$ of more than 3% and less than 15%; and/or
   a content of MgO of less than 5%; and/or
   a content of $Fe_2O_3$ of less than 5%; and/or
   a content of constituents other than $Cr_2O_3$, $Al_2O_3$, CaO, $ZrO_2$, MgO, $Fe_2O_3$, $SiO_2$ and $TiO_2$ of less than 3%.

7. A method for the manufacture of an additive-containing product for a glass furnace comprising, exclusively at the surface, an additive selected from:
   phosphorus compounds other than glasses and vitroceramics,
   WC, $MoO_3$,
   silicon carbide,
   boron carbide,
   silicon nitride,
   boron nitride,
   glasses comprising elemental phosphorus and/or iron and/or tungsten and/or molybdenum,
   vitroceramics comprising elemental phosphorus and/or iron and/or tungsten and/or molybdenum,
   and their mixtures, said additive-containing product, without taking into account said additive, having the following chemical analysis, as a percentage by weight on the basis of the oxides:

$Cr_2O_3 \geq 2\%$, and $Cr_2O_3+Al_2O_3+CaO+ZrO_2+MgO+Fe_2O_3+SiO_2+TiO_2 \geq 90\%$, and $Cr_2O_3+Al_2O_3+MgO \geq 60\%$, the content by weight of additive being in the range 0.01% to 6% on the basis of the additive-containing product, said method comprising the following steps in succession:
   A) preparing a feedstock comprising a particulate mixture and water;
   B) shaping said feedstock in a manner such as to form a preform;
   C) optionally, sintering said preform in a manner such as to obtain a sintered product,
   a precursor of said additive being applied to the surface of the preform and/or applied to the surface of the sintered product.

8. The method as claimed in claim 7, wherein the additive precursor is selected from phosphorus compounds other than glasses and vitroceramics, tungsten compounds other than glasses and vitroceramics, molybdenum compounds other than glasses and vitroceramics, iron in the form of the metal, aluminum in the form of the metal, silicon in the form of the metal and their mixtures, silicon carbide, boron carbide, silicon nitride, boron nitride, glasses comprising elemental phosphorus and/or iron and/or tungsten and/or molybdenum, vitroceramics comprising elemental phosphorus and/or iron and/or tungsten and/or molybdenum, and their mixtures.

9. The method as claimed in claim 8, wherein said additive precursor is selected from $FePO_4$, $MgPO_4$, $ZnPO_4$, $CuPO_4$, $H_3PO_4$, $WO_3$, WC, $MoO_3$, Si, Al, Fe, SiAl, FeSi, SiC, $B_4C$, $Si_3N_4$, a glass comprising iron, and their mixtures.

10. The method as claimed in claim 9, wherein said additive precursor is selected from $FePO_4$, $MgPO_4$, $H_3PO_4$, $WO_3$, $Mo_{O3}$, SiAl, FeSi, SiC, a glass comprising iron, preferably a glass comprising an iron content, expressed in the form of $Fe_2O_3$ in the range 1% to 15%, preferably in the range 4% to 15%, and their mixtures.

11. The method as claimed in claim 7, wherein the content by weight of additive precursor, on the basis of the weight of the particulate mixture exclusively of the shaping agent, is more than 0.1% and less than 6%.

12. The method as claimed in claim 7, in which the content by weight of additive precursor, on the basis of the weight of the particulate mixture exclusively of the shaping agent, is more than 0.5% and less than 3%, or in which the additive precursor is deposited onto the surface of the preform, the content by weight of additive precursor being in the range 0.01% and 5% on the basis of the weight of the preform after depositing the additive precursor, or in which the additive precursor is deposited onto the surface of the sintered product, the content by weight of additive precursor being in the range 0.01% to 5% on the basis of the weight of the sintered product after depositing the additive precursor.

13. The method as claimed in claim 7, wherein the feedstock comprises a granulate with a median circularity of more than 0.87 and/or a matrix fraction constituted by particles with a size of less than or equal to 50 μm which does not contain a hydraulic binder.

14. The glass furnace as claimed in claim 1, the additive-containing product comprising at least one region defining a surface which, in service, is not in contact with molten glass and which comprises additive.

15. The glass furnace as claimed in claim 1, wherein the additive-containing product is in the form of a vessel block or a bottom block, a glass feeder channel, or a consumable part for a glass feeder channel, in particular a spout, an orifice ring, a sleeve, a plunger, a stirrer or a rotor.

16. The glass furnace as claimed in claim 1,
the additive-containing product being obtained by a method comprising the following steps in succession:
   A) preparing a feedstock comprising a particulate mixture and water,
   B) shaping said feedstock in a manner such as to form a preform;
a precursor of said additive being applied to the surface of the preform, the content by weight of additive precursor being in the range 0.01% and 5% on the basis of the weight of the preform after depositing the additive precursor and/or,
the additive-containing product being obtained by a method comprising the following steps in succession:
   A) preparing a feedstock comprising a particulate mixture and water;
   B) shaping said feedstock in a manner such as to form a preform;
   C) sintering said preform in a manner such as to obtain a sintered product,
a precursor of said additive being applied to the surface of the sintered product, the content by weight of additive precursor being in the range 0.01% to 5% on the basis of the weight of the sintered product after depositing the additive precursor.

17. A glass furnace comprising an additive-containing product comprising, at the surface and/or in the core, an additive selected from:
   phosphorus compounds other than glasses and vitroceramics,
   WC, $MoO_3$,
   silicon carbide,
   boron carbide,
   silicon nitride,
   boron nitride,
   glasses comprising elemental phosphorus and/or iron and/or tungsten and/or molybdenum,
   vitroceramics comprising elemental phosphorus and/or iron and/or tungsten and/or molybdenum,
   and their mixtures,
said additive-containing product, without taking into account said additive, having the following chemical analysis, as a percentage by weight on the basis of the oxides:
   $Cr_2O_3 \geq 2\%$, and
   $Cr_2O_3+Al_2O_3+CaO+ZrO_2+MgO+Fe_2O_3+SiO_2+TiO_2 \geq 90\%$, and
   $Cr_2O_3+Al_2O_3+MgO \geq 60\%$,
the content by weight of additive being in the range 0.01% to 6% on the basis of the additive-containing product,
the additive-containing product being obtained by a method comprising the following steps in succession:
   A) preparing a feedstock comprising a particulate mixture and water;
   B) shaping said feedstock in a manner such as to form a preform;
   C) optionally, sintering said preform in a manner such as to obtain a sintered product,
a precursor of said additive being added to the feedstock and/or applied to the surface of the preform and/or applied to the surface of the sintered product, wherein said additive precursor is selected from $FePO_4$, $MgPO_4$, $ZnPO_4$, $CuPO_4$, $H_3PO_4$, $WO_3$, WC, $MoO_3$, Si, Al, Fe, SiAl, FeSi, SiC, $B_4C$, $Si_3N_4$, a glass comprising iron, and their mixtures.

18. The glass furnace as claimed in claim 17, wherein said additive precursor is selected from $FePO_4$, $MgPO_4$, $H_3PO_4$, $WO_3$, $MoO_3$, SiAl, FeSi, SiC, a glass comprising iron, and their mixtures.

19. The glass furnace as claimed in claim 17, wherein said additive precursor is selected from $FePO_4$, $MgPO_4$, $H_3PO_4$, $WO_3$, $MoO_3$, SiAl, FeSi, SiC, a glass comprising an iron content, expressed in the form of $Fe_2O_3$, in the range 1% to 15% and their mixtures.

20. The glass furnace as claimed in claim 17, wherein the additive-containing product, without taking into account said additive, has a $Cr_2O_3$ content of $\geq 9\%$, as percentages by weight on the basis of the oxides.

21. The glass furnace as claimed in claim 17, wherein the additive-containing product, without taking into account said additive, has, as percentages by weight on the basis of the oxides:
   a content of $Cr_2O_3$ of more than 15% and less than 98%; and/or
   a content of CaO of more than 0.1% and less than 3%; and/or
   a content of $Cr_2O_3+Al_2O_3$ of more than 55%; and/or
   a content of $SiO_2$ of more than 0.5% and less than 12%; and/or
   a content of $ZrO_2$ of more than 1% and less than 19%; and/or
   a content of MgO of less than 20%; and/or
   a content of $Fe_2O_3$ of less than 30%; and/or
   a content of constituents other than $Cr_2O_3$, $Al_2O_3$, CaO, $ZrO_2$, MgO, $Fe_2O_3$, $SiO_2$ and $TiO_2$ of less than 5%.

22. The glass furnace as claimed in claim 17, wherein the additive-containing product, without taking into account said additive, has, as percentages by weight on the basis of the oxides:
   a content of $Cr_2O_3$ of more than 30%; and/or
   a content of CaO of more than 0.3% and less than 1.5%; and/or
   a content of $Cr_2O_3+Al_2O_3$ of more than 80%; and/or
   a content of $SiO_2$ of more than 1% and less than 8%; and/or
   a content of $ZrO_2$ of more than 3% and less than 15%; and/or
   a content of MgO of less than 5%; and/or
   a content of $Fe_2O_3$ of less than 5%; and/or
   a content of constituents other than $Cr_2O_3$, $Al_2O_3$, CaO, $ZrO_2$, MgO, $Fe_2O_3$, $SiO_2$ and $TiO_2$ of less than 3%.

23. A glass furnace comprising an additive-containing product comprising, at the surface and/or in the core, an additive selected from:
   phosphorus compounds other than glasses and vitroceramics,
   WC, $MoO_3$,
   silicon carbide,
   boron carbide,
   silicon nitride,
   boron nitride,
   glasses comprising elemental phosphorus and/or iron and/or tungsten and/or molybdenum, vitroceramics comprising elemental phosphorus and/or iron and/or tungsten and/or molybdenum,
and their mixtures,
said additive-containing product, without taking into account said additive, having the following chemical analysis, as a percentage by weight on the basis of the oxides:
$Cr_2O_3 \geq 2\%$, and
$Cr_2O_3+Al_2O_3+CaO+ZrO_2+MgO+Fe_2O_3+SiO_2+TiO_2 \geq 90\%$, and
$Cr_2O_3+Al_2O_3+MgO \geq 60\%$,
the content by weight of additive being in the range 0.01% to 6% on the basis of the additive-containing product,
wherein the additive-containing product is in the form of a hardened concrete or a sintered concrete.

24. The glass furnace as claimed in claim 23, wherein the additive-containing product, without taking into account said additive, has a $Cr_2O_3$ content of $\geq 9\%$, as percentages by weight on the basis of the oxides.

25. The glass furnace as claimed in claim 23, wherein the additive-containing product, without taking into account said additive, has, as percentages by weight on the basis of the oxides:
a content of $Cr_2O_3$ of more than 15% and less than 98%; and/or
a content of CaO of more than 0.1% and less than 3%; and/or
a content of $Cr_2O_3+Al_2O_3$ of more than 55%; and/or
a content of $SiO_2$ of more than 0.5% and less than 12%; and/or
a content of $ZrO_2$ of more than 1% and less than 19%; and/or
a content of MgO of less than 20%; and/or
a content of $Fe_2O_3$ of less than 30%; and/or
a content of constituents other than $Cr_2O_3$, $Al_2O_3$, CaO, $ZrO_2$, MgO, $Fe_2O_3$, $SiO_2$ and $TiO_2$ of less than 5%.

26. The glass furnace as claimed in claim 23, wherein the additive-containing product, without taking into account said additive, has, as percentages by weight on the basis of the oxides:
a content of $Cr_2O_3$ of more than 30%; and/or
a content of CaO of more than 0.3% and less than 1.5%; and/or
a content of $Cr_2O_3+Al_2O_3$ of more than 80%; and/or
a content of $SiO_2$ of more than 1% and less than 8%; and/or
a content of $ZrO_2$ of more than 3% and less than 15%; and/or
a content of MgO of less than 5%; and/or
a content of $Fe_2O_3$ of less than 5%; and/or
a content of constituents other than $Cr_2O_3$, $Al_2O_3$, CaO, $ZrO_2$, MgO, $Fe_2O_3$, $SiO_2$ and $TiO_2$ of less than 3%.

* * * * *